United States Patent [19]

Lieberth

[11] Patent Number: 4,603,981
[45] Date of Patent: Aug. 5, 1986

[54] DEVICE FOR REGULATING OR LIMITING AT LEAST ONE TEMPERATURE VALUE OR A TEMPERATURE RANGE OF RADIATION OR CONTACT HEATERS OF ELECTRIC COOKING APPARATUS

[75] Inventor: Karl Lieberth, Strasshof, Austria

[73] Assignee: Electrovac, Fabrikation elektronischer Spezialartikel Gesellschaft m.b.H., Vienna, Austria

[21] Appl. No.: 662,871

[22] Filed: Oct. 19, 1984

[30] Foreign Application Priority Data

Nov. 4, 1983 [AT] Austria .................................. 3903/83

[51] Int. Cl.[4] .............................................. G01K 1/08
[52] U.S. Cl. ..................................... 374/210; 236/102
[58] Field of Search .................... 374/55, 56, 187, 188, 374/195, 198, 199; 236/102, 101 R

[56] References Cited

U.S. PATENT DOCUMENTS

| | | | |
|---|---|---|---|
| 1,567,081 | 12/1925 | Robertshaw | 236/102 |
| 1,744,465 | 1/1930 | Grayson | 236/102 |
| 2,055,922 | 9/1936 | Brennen | 236/102 |
| 2,132,749 | 10/1938 | Morrow | 236/102 |
| 2,221,062 | 11/1940 | Starr | 236/102 |
| 2,302,252 | 11/1942 | Raymond et al. | 236/102 |
| 2,650,028 | 8/1953 | Grayson | 236/102 |
| 3,112,881 | 12/1963 | Hodgson | 236/102 |
| 3,201,044 | 8/1965 | Fellner | 236/102 |
| 3,306,109 | 2/1967 | Caparone | 236/102 |
| 3,375,975 | 4/1968 | Smith et al. | 236/102 |

Primary Examiner—Robert I. Smith
Assistant Examiner—David R. Schuster
Attorney, Agent, or Firm—Martin A. Farber

[57] ABSTRACT

A device for regulating or respectively limiting the temperature provided by an electric heating element in cooking apparatus. At least one temperature sensor is provided for regulating or respectively limiting the temperature, the sensor having a rod of high thermal expansion which is disposed in a tube of low thermal expansion, the tube being held between holding elements. A support member adjoins each end of the tube and surrounds the rod. The holding elements are alongside each of the support members. The support member has a coefficient of thermal expansion $\alpha_1$ which is smaller than a coefficient of thermal expansion $\alpha_2$ of the adjoining holding element and larger than the coefficient of thermal expansion $\alpha_3$ of the tube.

6 Claims, 3 Drawing Figures

U.S. Patent  Aug. 5, 1986  4,603,981
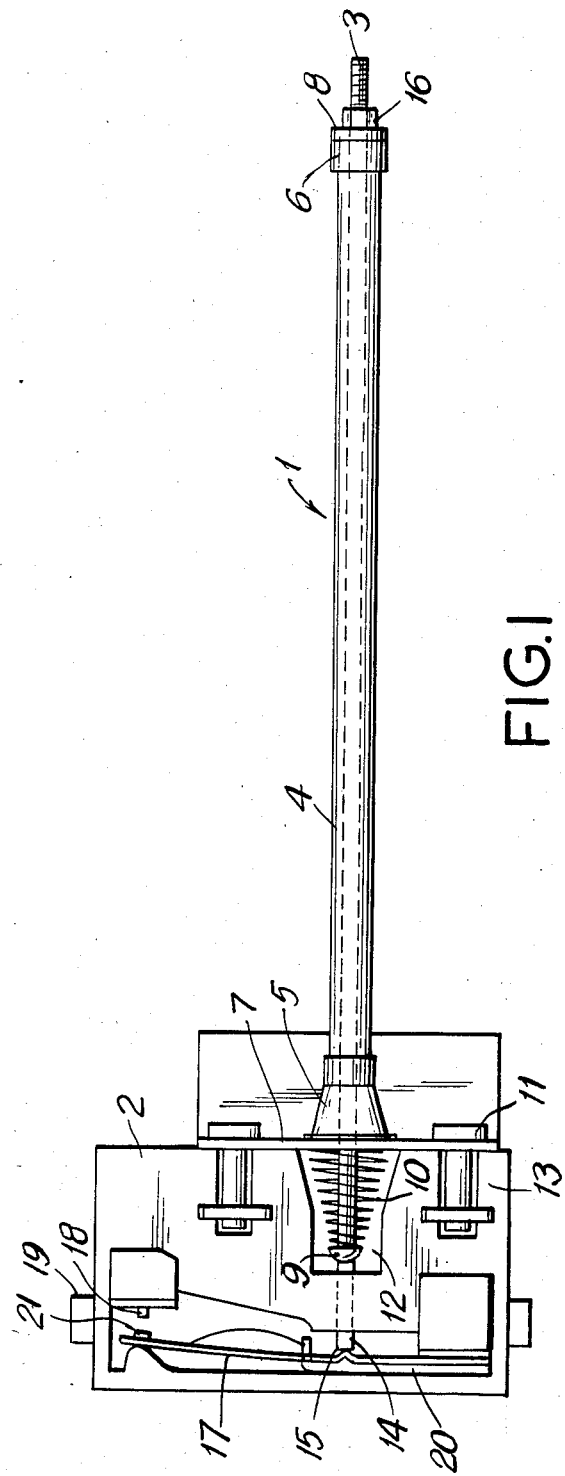
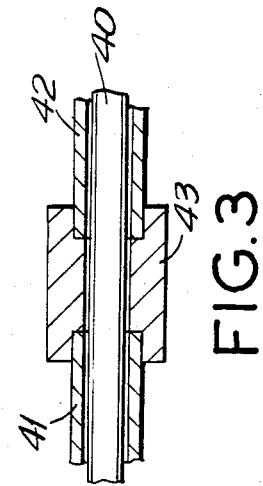
FIG.3
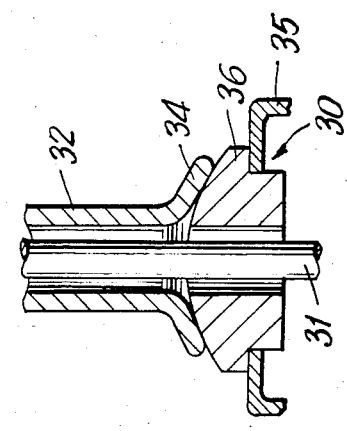
FIG.2

DEVICE FOR REGULATING OR LIMITING AT LEAST ONE TEMPERATURE VALUE OR A TEMPERATURE RANGE OF RADIATION OR CONTACT HEATERS OF ELECTRIC COOKING APPARATUS

FIELD AND BACKGROUND OF THE INVENTION

The present invention relates to a device for regulating or respectively limiting at least one temperature value or temperature range of radiation or contact heating in electric cooking apparatus, and wherein at least one temperature sensor is provided for regulating or limiting the temperatures, the sensor having a rod of high thermal expansion which is disposed in a tube of low thermal expansion, the tube being held between holding parts.

The regulating or limiting of the temperature in a device of the above-mentioned type is effected, in particular, in a manner wherein a temperature-induced axial movement of the rod-shaped temperature sensor is used to actuate the contact system, and in that a heating circuit is connected at a given temperature and then disconnected at a given higher temperature.

Since the temperatures to be measured lie within the range of up to 800° C., relative movement in a radial direction can take place in the region of a contact surface of the end of the tube, which movement may involve a rubbing between a stationary and a moving element. The tube is preferably formed of quartz glass, with an adjoining holding part which consists preferably of metal, the relative movement is a result of different coefficients of expansion. As a result of frequent moving back and forth, there results after lengthy use a higher frictional resistance caused by rubbing-in, and finally a splintering off of the end of the tube.

On the other hand, it has also been observed that splintering can occur even upon initial use due to a rough surface of the quartz tube.

The object of the present invention is to create a device for regulating or limiting at least one temperature value or temperature range of the above-described device in which damage caused by alternate temperature stresses, in particular the splintering-off of the tube ends, is dependably prevented.

SUMMARY OF THE INVENTION

This result is obtained in accordance with the invention in the manner that, adjoining the end of the tube, there is provided a support body which surrounds the rod and has a coefficient of thermal expansion $\alpha_1$ which is smaller than the coefficient of thermal expansion $\alpha_2$ of an adjoining holding part and larger than the coefficient of thermal expansion $\alpha_3$ of the tube.

With a support member constructed in this fashion, a difference in expansion is substantially reduced with reference to the coefficients of thermal expansion, so that the said radial relative movement between tube end and the adjoining support member is reduced to a negligible minimum. In this way, any possibility of damage, in particular, of a splintering-off of the tube end, is dependably excluded.

One particularly preferred embodiment of the invention resides in the fact that the support member is formed of oxide-ceramic material, in particular $Al_2O_3$. Such a support member, in addition to having a low coefficient of thermal expansion, also is of high strength, so as to be of advantageous use in accordance with the invention.

In another embodiment of the invention, the support member is formed of nickel-iron-cobalt alloys. A support member formed in this way has, in advantageous manner, a very low coefficient of thermal expansion, although, to be sure, the resistance to scaling is not very high. Thus the range of use is limited to a temperature range below 300° C., in which case the support member must extend out of the heating zone which is to be controlled.

In accordance with another advantageous embodiment of the invention, the support member can be formed of industrial porcelain. Such a development is suitable in particular for those uses in which high demands are not made on the strength of the support member.

In accordance with another embodiment of the invention, the support member, is disposed in the region of the switch housing, and is formed with a dome shape, and the adjoining end of the tube widens in funnel shape. With such a funnel-shaped widening of the end of the tube, increased resistance to breaking of the tube is obtained, subsequent adjustment and fine adjustment of the rod also being possible in simple fashion.

Finally, still in another preferred embodiment of the invention, the tube consists of a plurality of individual pieces of different coefficients of expansion $\alpha_2$ and $\alpha_3$ respectively, arranged axially one behind the other, and wherein the individual pieces are supported in—as seen in cross section—H-shaped intermediate support members having a coefficient of thermal expansion $\alpha_1$. With such construction, the advantages of reduced relative movement between tube end and intermediate support member can also be employed for bars which extend through several heating zones, in which connection, furthermore, an advantageous centering of the tube and a lengthening of the spark discharge path between heating coil and rod can be obtained.

BRIEF DESCRIPTION OF THE DRAWING

The invention will be described in further detail below with reference to three embodiments shown in the drawing wherein:

FIG. 1 is a side view of an enlarged device in accordance with the invention, FIG. 2 shows another embodiment of the end of the tube, and FIG. 3 shows another embodiment of the device of the invention for two heating zones.

DETAILED DESCRIPTION OF THE PREFERRED EMBODIMENTS

FIG. 1 shows a device for regulating or limiting the temperature, the device comprising a temperature sensor 1 and a switch head 2. The temperature sensor 1 has a rod 3 consisting of a material having high resistance to temperature and a high coefficient of thermal expansion, for instance a nickel-chromium alloy or an iron-chromium alloy, which is located with a tube 4. The tube consists of a material having high resistance to temperature and a low coefficient of thermal expansion, for instance quartz glass or ceramic, which forms a covering for the rod 3. Each of the ends of the tube 4 are bounded by a support member 5, 6. The latter are adjoined in turn by holding parts in the form of a base plate 7, and a washer 8 and nut 16, respectively. While the coefficient of thermal expansion $\alpha_3$ of the quartz tube 4 is about $5\times 10^{-7}/°C.$, the coefficient of thermal expansion $\alpha_2$ of the metallic holding parts 7, 8 is about $180\times 10^{-7}/°C.$ If $Al_2O_3$ is used as material for the two intermediate support members 5, 6 then the coefficient of thermal expansion $\alpha_1$ is about $70\times 10^{-7}/°C.$ The rod 3 is passed through holes in the support member 5 and the base plate 7, and through the support member 6 and the washer 8 and the nut 16. The other end of the rod 3 has a dished collar 9. Between this collar 9 and the base plate 7, and thus between the collar 9 and the one end of the tube 4 which contains the rod 3, there is a compression spring 10 which holds the rod 3 under tensile stress and thus presses the nut 16 against the outside of the washer 8.

The rod 3, with the parts arranged thereon, and the compression spring 10 form the temperature sensor, which is screwed by the screws 11 onto the switch head 2, the latter having a cutout 12 into which the end of the rod 3 having the compression spring 10 is inserted.

The switch head 2 comprises a housing 13 which is open on top, the open side being adapted to be covered by a cover plate. The inside of the housing 13 is in communication with the cutout 12 via a borehole which extends at least approximately coaxially to the rod 3 and within which there is a transmission member 14 which is axially displaceable within the borehole. One end of the transmission member 14 rests against a dished surface of the collar 9.

The transmission member 14 has an actuating surface 15 for the actuation of a contact system which serves to regulate or limit the temperature, said system having a contact spring 17 which bears a movable contact 21 and a connecting lug 19 which has a stationary contact 18. The contact spring 17 is firmly connected to a spring support 20 which also positions the contact spring 17.

In the position shown, the contacts 21, 18 are open and the heating circuit is thus open. If the heating circuit is connected to supply voltage, a heating coil of the heater is heated, by electric current flowing via normally closed contacts 21, 18. As a result of the heating, the temperature in the space between a cooking surface and the heating coil increases. The rod 3 expands, so that the transmission member 14 is moved towards the point of actuation of the contact spring 17. When the temperature in the space between the cooking surface and the heating coil reaches a value, for instance, of 700° C., the actuation surface 15 of the transmission member 14 comes against the contact spring 17, the contacts 21, 18 being thereby suddenly opened, so that the heating current is disconnected. When a rod 3 becomes shorter upon the following cooling, the contact spring 17 snaps back into the position whereby the contacts 21, 18 are closed.

As a result of the construction, in accordance with the invention, wherein at each end of the quartz tube 4 the support member 5 and 6 have a coefficient of thermal expansion $\alpha_1$ which is less than the coefficient of thermal expansion $\alpha_2$ of the adjoining holding members, namely, the washer 8 and the base plate 7 respectively, and wherein each holding member consists of metal with coefficient $\alpha_2$ greater than the coefficient of thermal expansion $\alpha_3$ of the quartz-glass tube 4, excessive relative radial movement between the end of the tube and the support member and thus damage to the ends of the tube are reliably excluded.

The support member 5, 6 preferably consist of an oxide-ceramic material such as the aforementioned $Al_2O_3$ or steatite or beryllium oxide. Materials of this group combine the advantages of high mechanical strength and resistance to scaling up to 800° C. with a coefficient of expansion $\alpha_1$ of a favorable order of magnitude which is between the coefficients of expansion $\alpha_2$ and $\alpha_3$.

In those cases of use where extremely high demands are not made on the mechanical strength of the support members, it is possible, while retaining the favorable ratio of the three coefficients of expansion with respect to each other and the resistance to scaling, also to use industrial porcelain which, on its part, has the advantage that it is easier to work.

Excellent results have also been obtained with NiFeCo alloys and NiFe alloys. These alloys, however, have the disadvantage that they are resistant to scaling only up to about 300° C., so that the support members must be positioned outside the heating zone.

An detail shown in FIG. 2 shows the end adjacent the switch housing 30 of a tube 32 surrounding a rod 31, said tube having its end 34 widened in funnel-shaped fashion.

Between a metallic holding part 35 of the switch housing 30 and the tube end 34, there is provided a support member 36 which has a dome-shaped surface.

The approximately middle part, shown in FIG. 3, of a part 40 of a device for regulating or limiting two temperature values or two temperature ranges of radiation or contact heating of electrical cooking apparatus has two coaxial tube pieces 41, 42. These tube pieces 41, 42 have different coefficients of expansion $\alpha_2$ and $\alpha_3$ ($\alpha_3 < < \alpha_2$) and are supported in an intermediate support member 43 having a coefficient of thermal expansion $\alpha_1$, $\alpha_1$ being also in this case so selected in accordance with the invention that we have $\alpha_3 < \alpha_1 < \alpha_2$. In this way, damage as a result of alternate temperature stresses to the end of the piece 42 having the smaller coefficient of thermal expansion $\alpha_3$ is avoided. The opposite ends of the tube pieces 41, 42 are supported on support members 5, 6 shown in FIG. 1.

The invention is not limited to the embodiments described above. Thus the support members may also be provided in the case of rods which operate on a double contact system. In such embodiments, the high mechanical load-bearing capacity of the support members is particularly important. Furthermore, the embodiment in accordance with FIG. 1 is not limited to the use of a washer 8, and the adjustment nut 16 can be seated directly on the support member, as will be the case, in particular, for support members of material which can withstand high mechanical loads.

Similarly, in the case of a tube end which is widened in funnel shape, the invention is not limited to the embodiment shown in FIG. 2. The support member 36 need not be passed through the metal part 35 of the switch housing 30 but may also rest in the manner of a washer on the metal part 35.

I claim:

1. In a device for switching electric power in the operation of a heating element for regulating at least one temperature range in electric cooking apparatus, wherein at least one temperature sensor is provided for activating a switching element of the device for regulating the temperature, the sensor having a rod of high thermal expansion which is disposed in a tube of low thermal expansion, the tube being held between holding elements, the improvement comprising a support member adjoining each end of the tube and surrounding the rod, the holding elements respectively adjoining said support members, said support members being positioned in seriatim along an axis of the tube between the adjoining holding element and an end surface of the tube, each said support member having a coefficient of thermal expansion $\alpha_1$ which is smaller than a coefficient of thermal expansion $\alpha_2$ of the adjoining holding element and larger than the coefficient of thermal expansion $\alpha_3$ of the tube.

2. The device according to claim 1, wherein
each support member is formed of oxide-ceramic material, in particular $Al_2O_3$.

3. The device according to claim 1, wherein
each support member is formed of nickel-iron-cobalt alloy.

4. The device according to claim 1, wherein
each support member is formed from industrial porcelain.

5. The device according to claim 1, further comprising
a switch housing, and wherein a support member is disposed in the region of the switch housing, the support member being formed with a dome shape, and wherein an adjoining end of the tube is widened in funnel shape.

6. The device according to claim 1, wherein
said tube comprises a plurality of individual sections having different coefficients of expansion $\alpha_2$ and $\alpha_3$ and being located one behind the other, and wherein the individual sections are supported by intermediate support members having an H-shaped cross section and a coefficient of thermal expansion $\alpha_1$.

* * * * *